(12) United States Patent
Ito et al.

(10) Patent No.: US 10,166,621 B2
(45) Date of Patent: Jan. 1, 2019

(54) WELDING DEVICE AND WELDING SYSTEM

(71) Applicant: KAWASAKI JUKOGYO KABUSHIKI KAISHA, Kobe-shi, Hyogo (JP)

(72) Inventors: Chiaki Ito, Miki (JP); Shingo Yonemoto, Kakogawa (JP); Takanori Kozuki, Kakogawa (JP); Yukio Ikezawa, Kobe (JP); Masahiko Akamatsu, Himeji (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 109 days.

(21) Appl. No.: 15/125,711

(22) PCT Filed: Mar. 14, 2014

(86) PCT No.: PCT/JP2014/001461
§ 371 (c)(1),
(2) Date: Sep. 13, 2016

(87) PCT Pub. No.: WO2015/136574
PCT Pub. Date: Sep. 17, 2015

(65) Prior Publication Data
US 2017/0008113 A1  Jan. 12, 2017

(51) Int. Cl.
*B23K 9/028* (2006.01)
*B23K 37/02* (2006.01)
(Continued)

(52) U.S. Cl.
CPC ............ *B23K 9/0286* (2013.01); *B23K 9/167* (2013.01); *B23K 37/0217* (2013.01);
(Continued)

(58) Field of Classification Search
CPC ...... B23K 9/0286; B23K 9/167; B23K 9/173; B23K 37/02; B23K 37/0217;
(Continued)

(56) References Cited

U.S. PATENT DOCUMENTS 4,132,338 A * 1/1979 Bove .................. B23K 37/0217
228/27
2005/0224480 A1* 10/2005 Lipnevicius ......... B23K 9/0216
219/125.11
(Continued)

FOREIGN PATENT DOCUMENTS

CN 101224529 A 7/2008
JP S62-193990 U 12/1987
(Continued)

OTHER PUBLICATIONS

Jun. 3, 2014 International Search Report issued in International Patent Application No. PCT/JP2014/001461.
(Continued)

*Primary Examiner* — Alexander M Valvis
(74) *Attorney, Agent, or Firm* — Oliff PLC

(57) ABSTRACT

A welding device which performs butt welding of tubes includes a table. The table supports a rotary member of a circular-arc shape to which a welding torch is mounted, and a gear train that rotates the rotary member around a center axis of the tubes. The welding device includes a first movement mechanism that moves the table in a first direction perpendicular to the center axis of the tubes, and a second movement mechanism that moves the first movement mechanism in a second direction perpendicular to the center axis of the tubes and the first direction.

7 Claims, 6 Drawing Sheets

(51) Int. Cl.
*B23K 9/167* (2006.01)
*B23K 101/04* (2006.01)
*B23K 101/06* (2006.01)

(52) U.S. Cl.
CPC ...... *B23K 37/0276* (2013.01); *B23K 37/0282* (2013.01); *B23K 2101/04* (2018.08); *B23K 2101/06* (2018.08)

(58) Field of Classification Search
CPC ............ B23K 37/0282; B23K 2201/04; B23K 2201/06; B23K 9/30; B23K 37/0276
USPC .............................................. 219/60 R, 60.2
See application file for complete search history.

(56) References Cited

U.S. PATENT DOCUMENTS

| | | | |
|---|---|---|---|
| 2006/0076318 A1* | 4/2006 | Watanabe | B23K 9/0286 219/60 A |
| 2007/0297556 A1 | 12/2007 | Spencer et al. | |
| 2011/0186615 A1* | 8/2011 | Gatlin | B23K 9/0286 228/102 |
| 2015/0129557 A1* | 5/2015 | Miller | B23K 37/003 219/61.7 |

FOREIGN PATENT DOCUMENTS

| | | |
|---|---|---|
| JP | S62-202971 U | 12/1987 |
| JP | 2000-117431 A | 4/2000 |
| JP | 2001-225165 A | 8/2001 |

OTHER PUBLICATIONS

Sep. 14, 2016 International Preliminary Report on Patentability issued in International Patent Application No. PCT/JP2014/001461.
Jun. 14, 2016 Office Action issued in Japanese Patent Application No. 2012-203880.
Sep. 22, 2017 Office Action issued in Chinese Patent Application No. 201480074292.1.

* cited by examiner

WELDING DEVICE AND WELDING SYSTEM

TECHNICAL FIELD

The present invention relates to a welding device which performs butt welding of tubes, and a welding system including this welding device.

BACKGROUND ART

Conventionally, a welding device which automatically performs butt welding of tubes is known. For example, as shown in FIGS. 6A and 6B, Patent Literature 1 discloses a welding device 100 which is capable of performing all-position welding of tubes 150 placed to be oriented horizontally (laid down).

In the welding device 100, a welding torch 130 is capable of being moved in the radial direction of the tubes 150 in order to adjust the length of an arc. Specifically, the welding device 100 includes two rings of a circular-arc shape which are a rotational motion ring 110 and a vertical motion ring 120, as rotary members which are rotatable around the center axis of the tubes 150. The rotational motion ring 110 and the vertical motion ring 120 are rotatable independently of each other.

The welding torch 130 is pivotally mounted to the rotational motion ring 110 via a torch pedestal 140. The vertical motion ring 120 is provided with a groove 125 inclined with respect to a circumferential direction. A shaft 145 fixed to the torch pedestal 140 is inserted into the groove 125. The vertical motion ring 120 relatively rotates with respect to the rotational motion ring 110. Thus, the shaft 145 is guided by the groove 125, and the welding torch 130 is moved close to or away from the tubes 150.

CITATION LIST

Patent Literature

Patent Literature 1: Japanese-Laid Open Patent Application Publication No. 2001-225165

SUMMARY OF INVENTION

Technical Problem

However, in the welding torch 100 shown in FIGS. 6A and 6B, since a mechanism for moving the welding torch 100 in the radial direction of the tubes 150 is incorporated into the rotary members (the rotational motion ring 110 and the vertical motion ring 120) which are rotatable around the center axis of the tubes 150, these rotary members are required to have a great width. For this reason, in a case where an installation such as a boiler panel including the tubes 150 arranged at small pitches is manufactured, the welding torch 100 cannot be used.

In view of the above-described circumstances, an object of the present invention is to provide a welding device which can move a welding torch in the radial direction of tubes and reduce the width of a rotary member which is rotatable around the center axis of the tubes. Another object of the present invention is to provide a welding system including the welding device.

Solution to Problem

To achieve the above-described object, a welding device which performs butt welding of tubes, of the present invention, comprises a rotary member of a circular-arc shape to which a welding torch is mounted, the rotary member including external teeth; a gear train that meshes with the rotary member and rotates the rotary member around a center axis of the tubes; a table supporting the rotary member and the gear train; a first movement mechanism that moves the table in a first direction perpendicular to the center axis of the tubes; and a second movement mechanism that moves the first movement mechanism in a second direction perpendicular to the center axis of the tubes and the first direction.

In accordance with this configuration, since the first movement mechanism and the second movement mechanism move the table supporting the rotary member, the welding torch can be moved in the radial direction of the tubes. Therefore, the rotary member is not required to be provided with a mechanism for moving the welding torch, and as a result, the width of the rotary member can be reduced.

The above-described welding device may further comprise a third movement mechanism that moves the second movement mechanism along the center axis of the tubes; and a clamp mechanism that secures the third movement mechanism to the tube. In accordance with this configuration, the welding torch can be moved in the circumferential direction of the tubes while the welding torch is reciprocated in the axial direction of the tubes, namely, a weaving motion can be realized. In addition, the welding torch can be moved in such a manner that the tip end of the welding torch draws an oval on a flat plane extending through the center axis of the tubes.

The welding torch may include an electrode that generates an arc between the electrode and a welding area of the tubes, and the welding device may further comprise a measuring unit that measures a distance between the electrode and the welding area; and a controller that controls the first drive mechanism and the second drive mechanism in such a manner that the distance measured by the measuring unit becomes a predetermined value. In accordance with this configuration, the welding with a high quality can be performed.

According to an aspect of the present invention, a welding system used to perform on a horizontal plane butt welding of a first tube and a second tube which is bent, comprises: a support plate located above the second tube and fastened to the second tube to cover the second tube; and the above-described welding device fastened to the support plate in a state in which the welding device is placed on the support plate.

In a case where the butt welding of the tubes is performed and one of the tubes is bent, how the welding device is fastened to the bent tube becomes a problem. For example, in a case where the welding device includes a clamp mechanism for clamping the tube, this clamp mechanism cannot clamp the bent portion of the tube. In contrast, in accordance with the above-described configuration, since the support plate is located above the bent second tube, the welding device can be fastened at a flexible location, irrespective of the shape of the second tube. This makes it possible to install the welding device at a location that is optimal for the welding area of the tubes.

According to another aspect of the present invention, a welding system used to perform on a horizontal plane butt welding of a first tube protruding from a base pipe and a second tube, comprises a support plate located above the second tube and fastened to the second tube to cover the second tube; the above-described welding device fastened to the support plate in a state in which the welding device is placed on the support plate; and a pair of radial positioning members mounted to the welding device in such a manner that the pair of radial positioning members are located on both sides of the welding torch and protrude from the welding device, the pair of radial positioning members having tip ends, respectively that contact the base pipe.

In a case where the second tube is joined to the first tube protruding from the base pipe, it is desirable to install the welding device quickly at a proper location by utilizing the base pipe. In accordance with the above-described configuration, since the pair of radial positioning members are mounted to the welding device, and the tip ends of the pair of radial positioning members contact the base pipe, the welding device can be positioned in the radial direction of the base pipe. In addition, since the welding device is placed on the support plate, the welding device can be positioned while the welding device is sliding on the support plate. This makes it possible to install the welding device quickly at a proper location.

The base pipe may extend vertically, the first tube may be each (one) of a plurality of first tubes arranged vertically, and the welding system may further comprise: a circumferential positioning member mounted to the welding device, the circumferential positioning member being engageable with the first tube located above the first tube joined to the second tube, among the plurality of first tubes. In accordance with this configuration, the welding device can also be positioned in the circumferential direction of the base pipe. This makes it possible to install the welding device more quickly at a proper location.

For example, the circumferential positioning member may include a taper pin that is capable of being advanced and retracted with respect to the welding device and has a tip end that is fittable into the first tube.

The second tube may be bent. In accordance with this configuration, since the support plate is located above the bent second tube, the welding device can be fastened at a flexible location, irrespective of the shape of the second tube.

Advantageous Effects of Invention

In accordance with the present invention, the welding torch can be moved in the radial direction of the tubes, and the width of the rotary member that is rotatable around the center axis of the tubes can be reduced.

DESCRIPTION OF EMBODIMENTS

Hereinafter, the embodiments of the present invention will be described with reference to the drawings.

(Welding Device)

Figure 1:
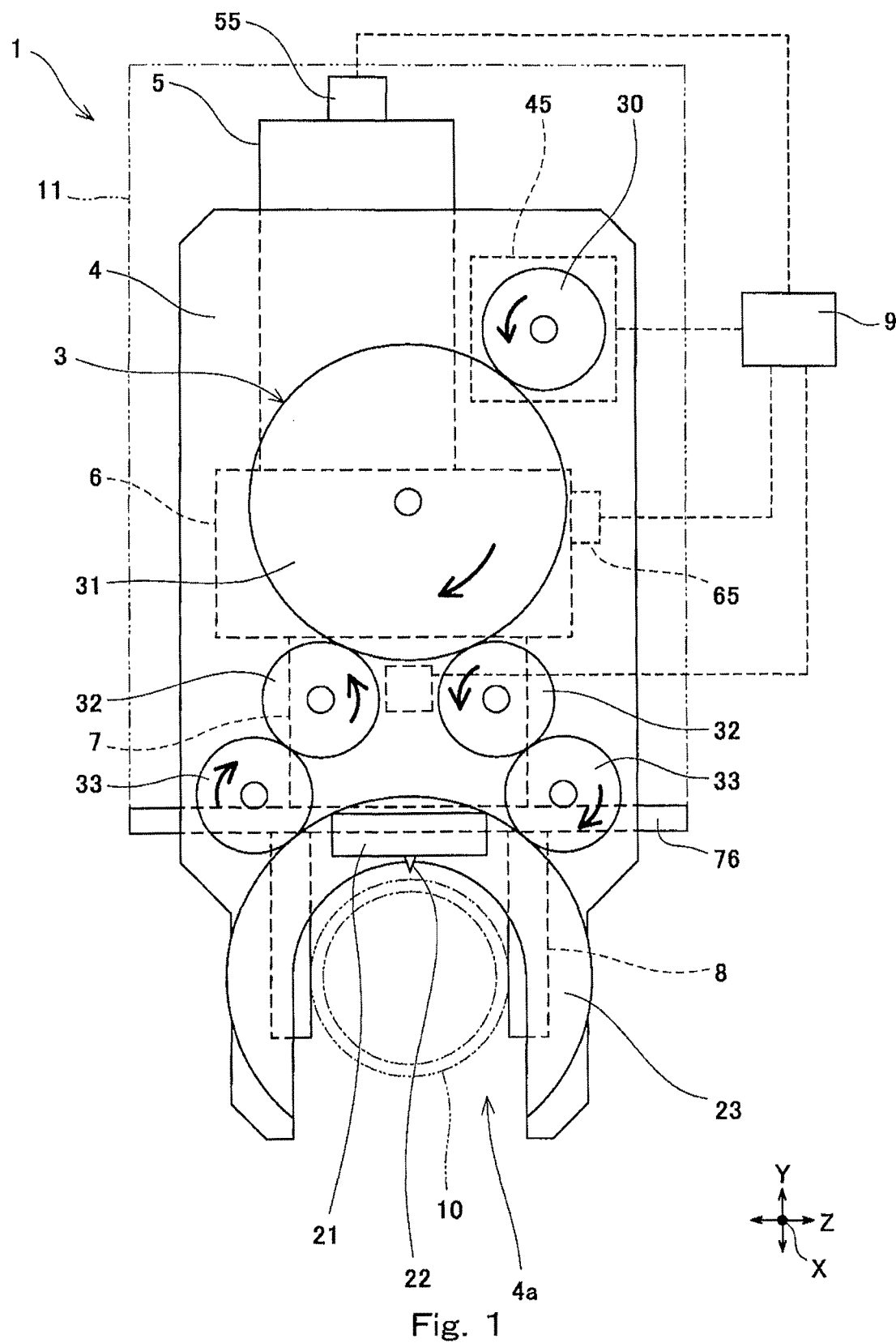
FIG. 1 is a front view of a welding device according to one embodiment of the present invention.
Figure 2:
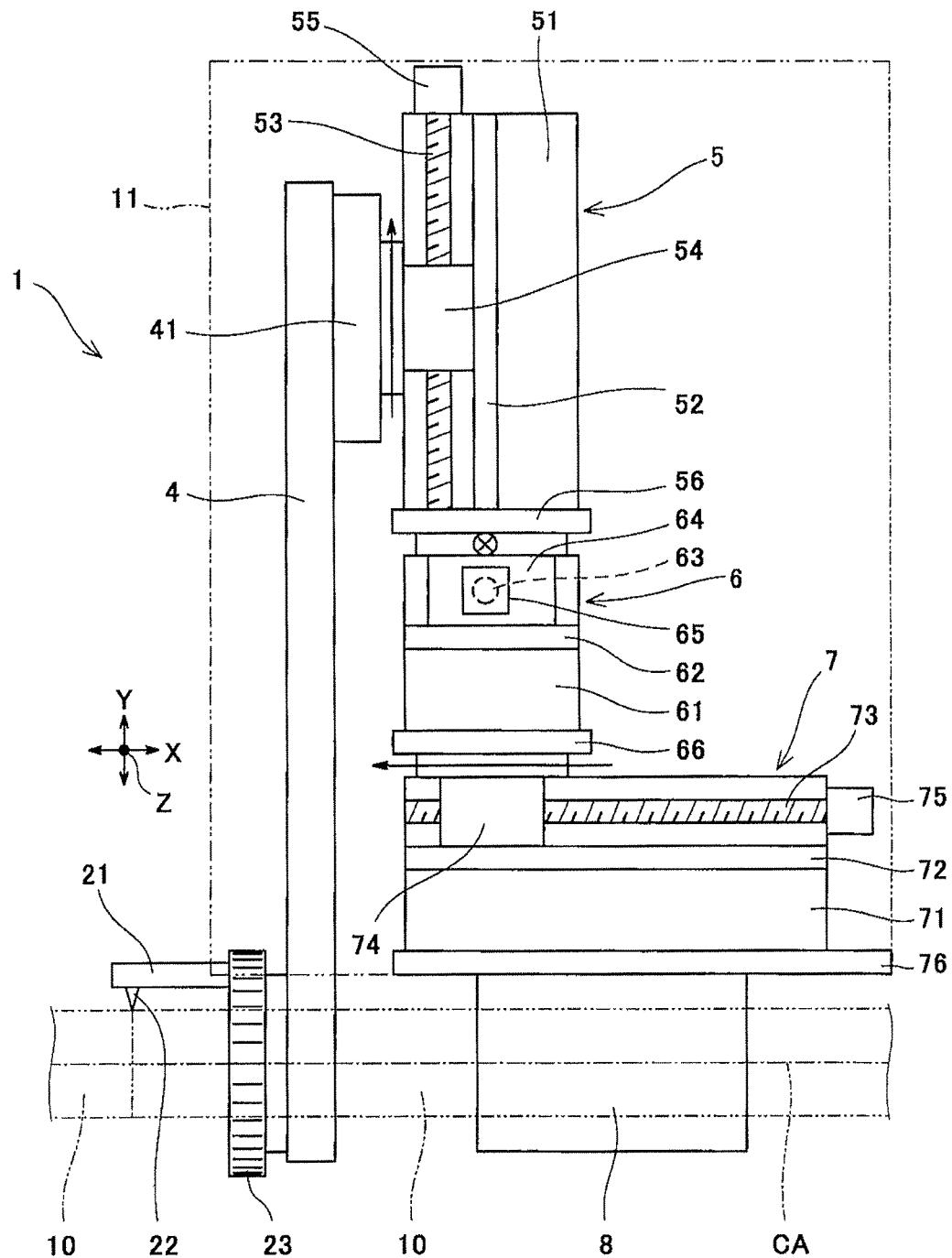
FIG. 2 is a view schematically showing the configuration of the welding device of FIG. 1, when viewed from a side.

FIGS. 1 and 2 show a welding device 1 according to one embodiment of the present invention. This welding device 1 automatically performs butt welding of tubes 10. In the present embodiment, the tubes 10 are placed to be oriented horizontally (laid down), and the welding device 1 is placed over one of the tubes 10.

Hereinafter, for easier understanding of the description, the axial direction (a direction in which a center axis CA extends) of the tubes 10 will be referred to as an X-direction, a vertical direction (corresponding to a first direction of the present invention) perpendicular to the X-direction will be referred to as a Y-direction, and a horizontal direction (corresponding to a second direction of the present invention) perpendicular to the X-direction and the Y-direction will be referred to as a Z-direction. In the X-direction, a side which is close to a welding torch 21 from the perspective of a table 4 which will be described later will be referred to as a front side, and an opposite side thereof will be referred to as a rear side. It should be noted that the first direction and the second direction of the present invention may be reversed (specifically, the first direction is the horizontal direction, and the second direction is the vertical direction), or the first direction and the second direction may be oblique directions, respectively. Further, the tubes 10 may not be necessarily placed to be oriented horizontally and may be placed to be oriented vertically or obliquely.

The welding device 1 includes the welding torch 21, a rotary member 23 to which the welding torch 21 is mounted, and the table 4 which supports the rotary member 23 in such a manner that the rotary member 23 is rotatable. In addition, the welding device 1 includes three movement mechanisms which three-dimensionally move the table 4, namely, a first movement mechanism 5, a second movement mechanism 6, and a third movement mechanism 7, and a clamp mechanism 8 which secures the third movement mechanism 7 to the tube 10.

The welding torch 21 has a flat plate shape extending in parallel with the X-direction. An electrode 22 is provided on the lower surface of the welding torch 21 to generate an arc between the electrode 22 and the welding area of the tubes 10. As defined herein, the term "welding area" refers to a bottom portion of a groove in a first layer and a previous layer in second and the following layers, for example, in a case where the groove is formed in a welding joint between the tubes 10, and a number of welded layers are formed.

Figure 3:
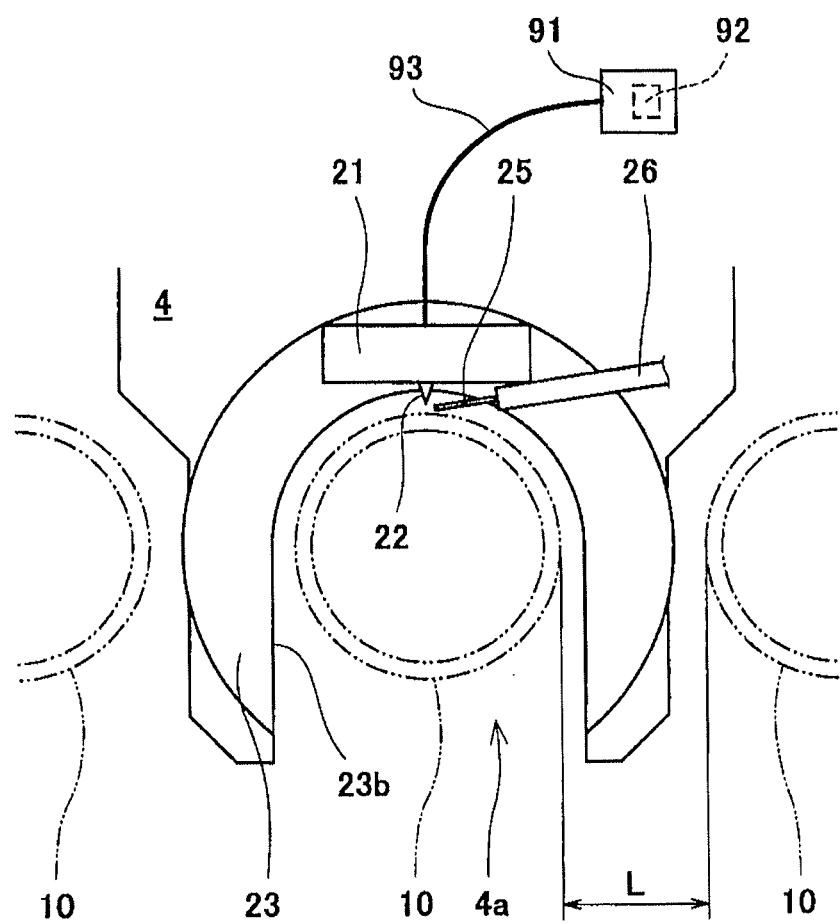
FIG. 3 is a front view showing in an enlarged manner a region which is in the vicinity of a rotary member in the welding device of FIG. 1.

The welding device 1 of the present embodiment performs TIG (Tungsten Inert Gas) welding, and the electrode 22 is a non-consumable electrode. As shown in FIG. 3, a tip end 26 of a wire supply unit which supplies a welding wire 25 to a region between the electrode 22 and the welding area is fastened to the welding torch 1 by use of a bracket (not shown).

A voltage is applied by a power supply unit 91 to the electrode 22 via a cable 93 and the welding torch 21. The power supply unit 91 is provided with a voltage meter 92 which measures the voltage applied to the electrode 22. The voltage applied to the electrode 22 is varied according to a distance between the electrode 22 and the welding area. In other words, the voltage meter 92 indirectly measures the distance between the electrode 22 and the welding area, and corresponds to a measuring unit of the present invention.

Turning back to FIGS. 1 and 2, the rotary member 23 is formed with a U-shaped hollow portion into which the tubes 10 are fittable, and has a circular-arc shape. The rotary member 23 is formed with external teeth on an outer peripheral surface thereof.

The table 4 which supports the rotary member 23 in such a manner that the rotary member 23 is rotatable has a plate shape extending in a direction perpendicular to the X-direction. The table 4 is formed with an opening 4a which has a width that is substantially equal to the width of the hollow portion of the rotary member 23 and faces downward.

A gear train 3 is supported on the table 4 in such a manner that the gear train 3 meshes with the rotary member 23 to rotate the rotary member 23 around the center axis CA of the tubes 10. A turn motor 45 is mounted to the rear surface of the table 4 to rotate a drive gear 30 included in gears of the gear train 3. In FIG. 2, for the purpose of simpler illustration, the gear train 3 and the turn motor 4 are omitted.

The gear train 3 includes the drive gear 30, a first driven gear 31 which meshes with the drive gear 30, a pair of second driven gears 32 which mesh with the first driven gear 31, and a pair of third driven gears 33 each of which meshes with the corresponding second driven gear 32 and the rotary member 23. In this configuration, even when the hollow portion of the rotary member 23 is approaching one of the third driven gears 33, a rotational force is transmitted to the rotary member 23 via the other of the third driven gears 33.

The first movement mechanism 5 serves to move the table 4 in the Y-direction. Specifically, the first movement mechanism 5 includes a base 51, a slide block 54 which is supported by a guide rail 52 in such a manner that the slide block 54 is slidable in the Y-direction with respect to the base 51, a screw shaft 53 which is threadingly engageable with the slide block 54, and a first motor 55 which rotates the screw shaft 53. The table 4 is fastened to the slide block 54 via a mounting seat 41.

The second movement mechanism 6 serves to move the first movement mechanism 5 in the Z-direction. Specifically, the second movement mechanism 6 includes a base 61, a slide block 64 which is supported by a guide rail 62 in such a manner that the slide block 64 is slidable in the Z-direction with respect to the base 61, a screw shaft 63 which is threadingly engageable with the slide block 64, and a second motor 65 which rotates the screw shaft 63. The base 51 of the first movement mechanism 5 is fastened to the slide block 64 via a mounting seat 56.

The third movement mechanism 7 serves to move the second movement mechanism 6 in the X-direction. Specifically, the third movement mechanism 7 includes a base 71, a slide block 74 which is supported by a guide rail 72 in such a manner that the slide block 74 is slidable in the X-direction with respect to the base 71, a screw shaft 73 which is threadingly engageable with the slide block 74, and a third motor 75 which rotates the screw shaft 73. The base 61 of the second movement mechanism 6 is fastened to the slide block 74 via a mounting seat 66.

The third movement mechanism 7 is mounted to a base plate 76 extending in parallel with the X-direction. The above-described clamp mechanism 8 is also mounted to the base plate 76. The clamp mechanism 8 is configured to clamp the tube 10 by the operation of a knob (not shown). With this clamping operation, the base plate 76 is maintained to be oriented, for example, horizontally. Further, a case 11 accommodating therein the three movement mechanisms 5 to 7, a large part of the table 4, and the gear train 3 is mounted to the base plate 76.

The turn motor 45, and the first to third motors 55, 65, 75 which are described above are controlled by a controller 9 (see FIG. 1). In particular, the controller 9 controls the first motor 55 and the second motor 65 so that the distance between the welding area and the electrode 22 which is indirectly measured by the voltage meter 92 becomes a predetermined value. For example, the predetermined value may be constant irrespective of the location or depth of the welding area, and the like, or may be varied depending on the location or depth of the welding area, and the like.

As described above, in the welding device 1 of the present embodiment, the first movement mechanism 5 and the second movement mechanism 6 move the table 4 supporting the rotary member 23 to allow the welding torch 21 to be moved in the radial direction of the tubes 10. In this configuration, the rotary member 23 is not required to be provided with a mechanism for moving the welding torch 21. Therefore, the width of the rotary member 23 can be reduced. As a result, for example, as shown in FIG. 3, even in a case where the tubes 10 are arranged at small pitches and a spacing L between adjacent tubes 10 is small, the butt welding can be performed automatically by use of the welding device 1.

In the present embodiment, the welding device 1 includes the third movement mechanism 7 and the clamp mechanism 8. With this configuration, the welding torch 21 can be moved in the circumferential direction of the tubes 10 while the welding torch 21 is reciprocated in the axial direction of the tubes 10, namely, a weaving motion can be realized. In addition, the welding torch 21 can be moved in such a manner that the electrode 22 at the tip end of the welding torch 21 draws an oval on a flat plane extending through the center axis CA of the tubes 10.

In the present embodiment, the first motor 55 and the second motor 65 are controlled so that the distance between the welding area and the electrode 22 becomes the predetermined value depending on the welding area. Therefore, the welding with a high quality can be performed.

(Modified Example of Welding Device)

The present invention is not limited to the above-described embodiment, and can be modified in various ways within the scope of the invention.

For example, the present invention is applicable to a welding device which performs MIG (Metal Inert Gas) welding or MAG (Metal Active Gas) welding. In this case, the welding wire functions as the electrode, and a current flowing through the welding wire changes according to the distance between the electrode and welding area. Therefore, a current meter may be used as the measuring unit of the present invention.

Alternatively, a distance sensor which directly measures the distance between the electrode of the welding torch and the welding area may be used as the measuring unit of the present invention.

Although in the above-described embodiment, a linear motion system using the screw shaft is used in each of the movement mechanisms 5, 6, 7, for example, a linear motion system using a rack and a pinion may be used in each of the movement mechanisms 5, 6, 7.

(Welding System)

Figure 4:
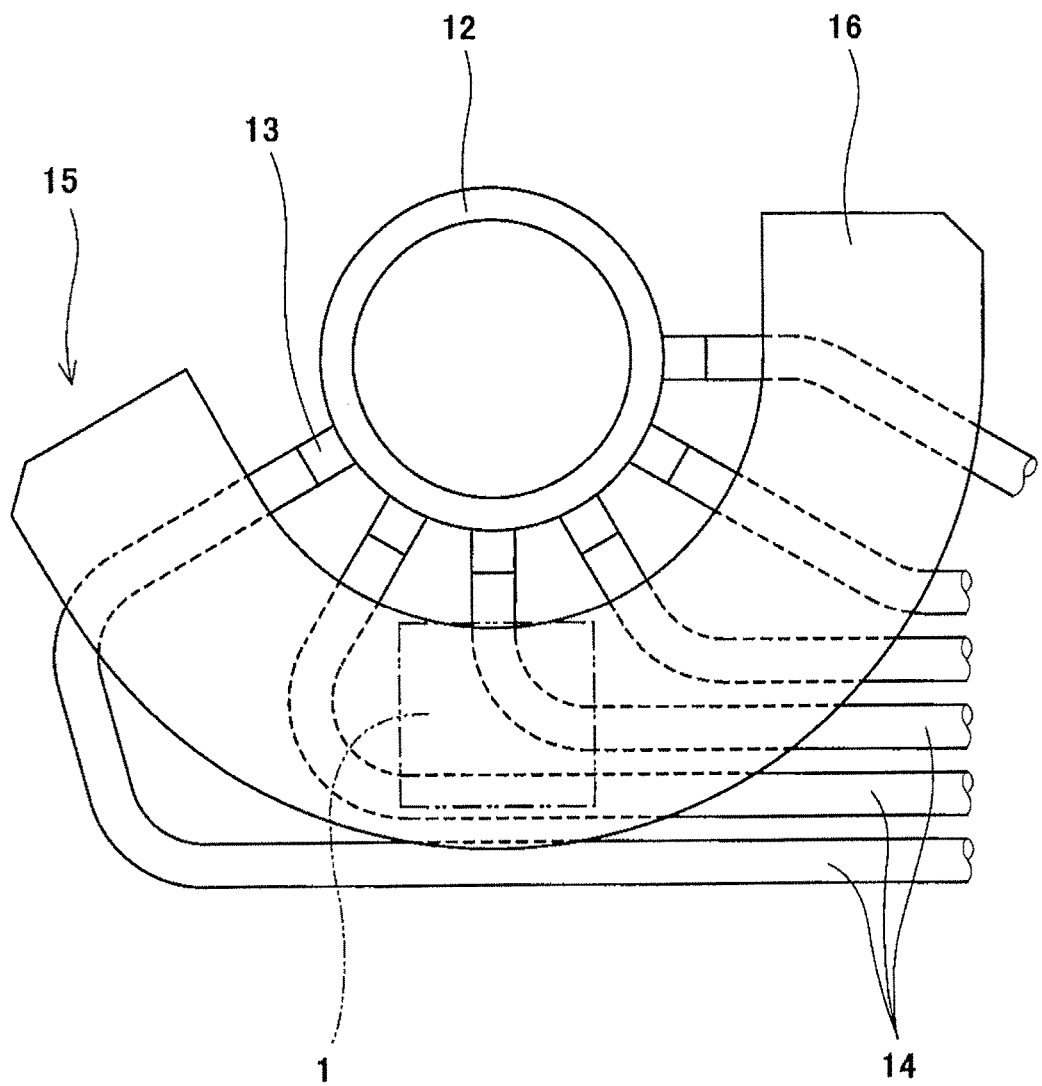
FIG. 4 is a plan view of a welding system including the welding device of FIG. 1.

Next, with reference to FIG. 4, and FIGS. 5A and 5B, a welding system 15 including the above-described welding device 1 will be described. The welding system 15 is used to perform butt welding of first tubes 13 and second tubes 14 on a horizontal plane. The "butt welding on a horizontal plane" is meant to include a case where the center axis of the first and second tubes 13, 14 is slightly inclined (e.g., at an angle of 10 degrees or less) with respect to the horizontal direction, as well as a case where the center axis of the first and second tubes 13, 14 is parallel to the horizontal direction.

In the present embodiment, a plurality of first tubes 13 protrude radially from a base pipe 12 extending vertically. That is, the first tubes 13 are short pipes. The first tubes 13 are provided in a substantially half region of the outer peripheral surface of the base pipe 12. The first tubes 13 are also arranged vertically. In contrast, the second tubes 14 to be joined to the first tubes 13, respectively, are bent on a horizontal plane. In the illustrated example, all (six in the illustrated example) of the second tubes 14 provided at specified height positions are placed to conform to the first tubes 13, respectively.

The welding system 15 includes a support plate 16 which is located above the second tubes 14 and covers the second plates 14, and the welding device 1 placed on the support plate 16. In the present embodiment, the support plate 16 has a circular-arc shape extending in the circumferential direction of the base pipe 12 in such a manner that the support plate 16 is provided over the whole of all of the second support plates 16. The support plate 16 is fastened to at least one second tube 14. The welding device 1 is fastened to the support plate 16 in a state in which the welding device 1 is placed on the support plate 16.

Figure 5A:
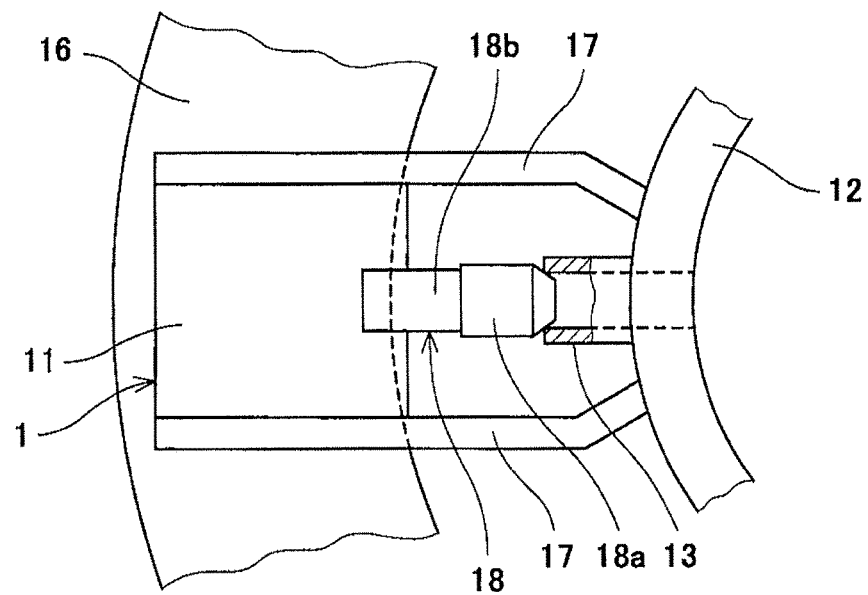
FIG. 5A is a plan view showing in an enlarged manner a part of the welding system of FIG. 4.
Figure 5B:
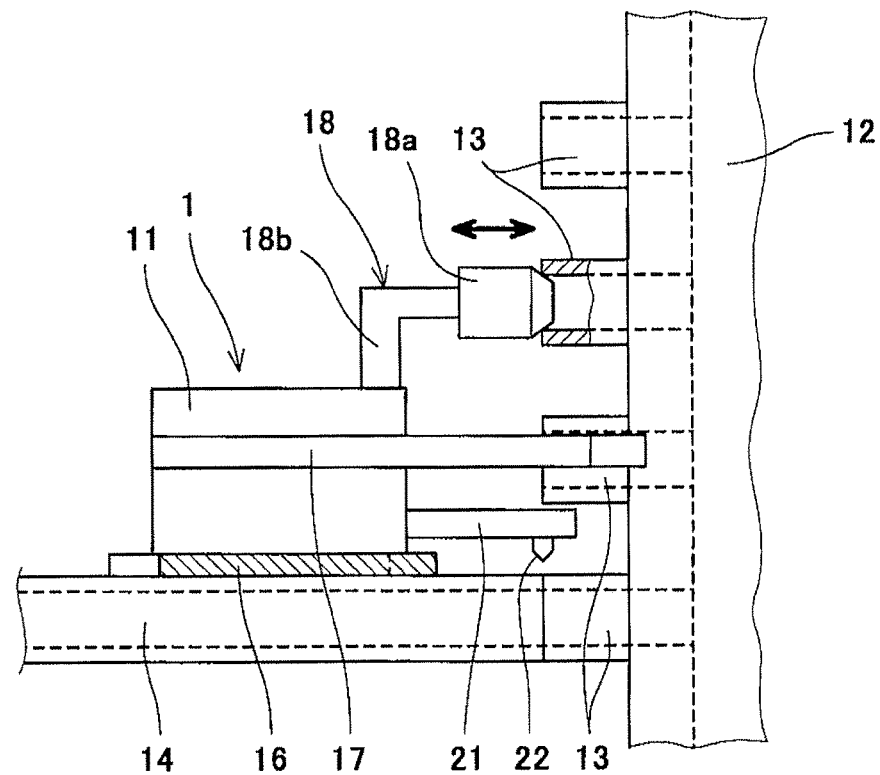
FIG. 5B is a side view showing in an enlarged manner a part of the welding system of FIG. 4.
Figure 6A:
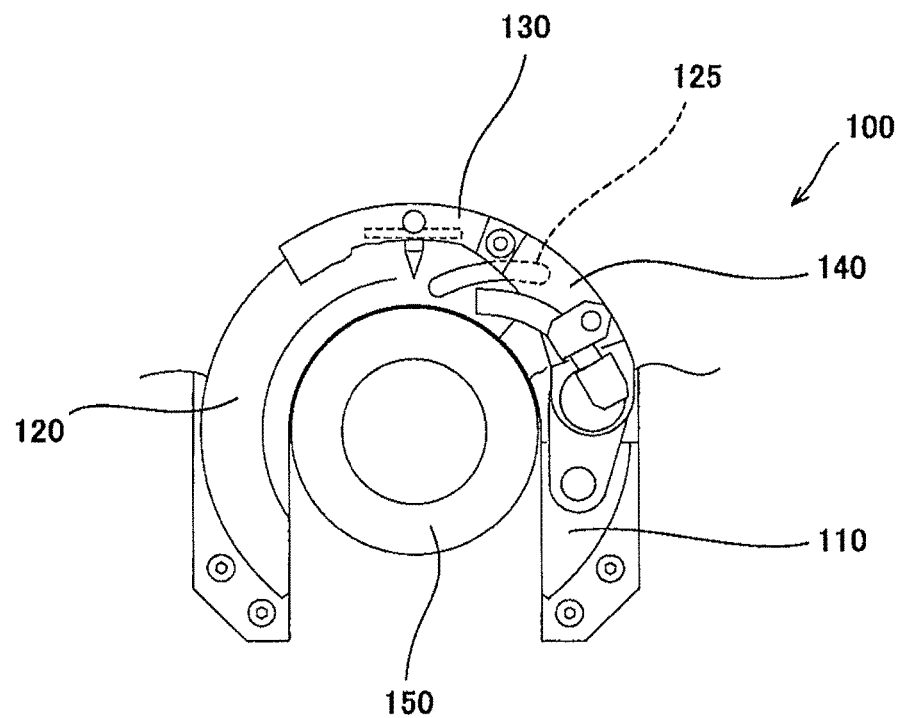
FIG. 6A is a front view of major components of a conventional welding device.
Figure 6B:
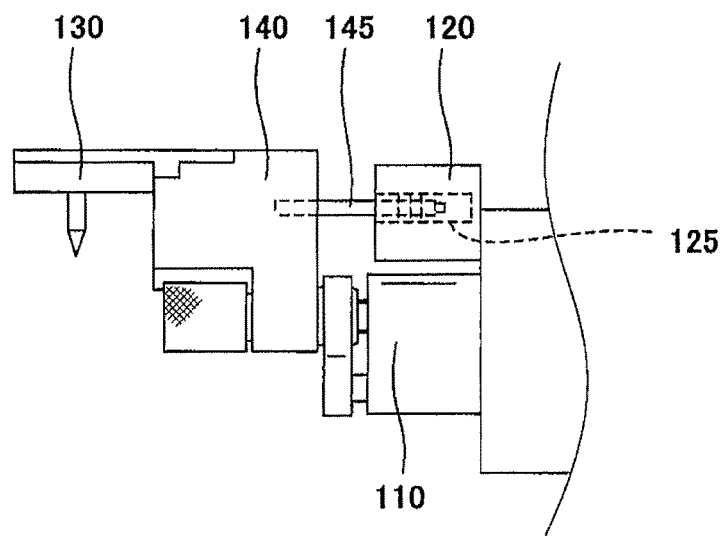
FIG. 6B is a side view of the major components.

Further, in the present embodiment, as shown in FIGS. 5A and 5B, a pair of radial positioning members 17 and a circumferential positioning member 18 are mounted to the welding device 1. The pair of radial positioning members 17 are located on both sides of the welding torch 21 and protrude from the welding device 1.

Specifically, the pair of radial positioning members 17 are rod-like members extending in a direction (namely, the protruding direction of the welding torch 21) perpendicular to the table 4 (see FIGS. 1, and 2), and are fastened to the both side surfaces of the case 11 of the welding device 1. Alternatively, the pair of radial positioning members 17 may be fastened to the base plate 76 (see FIGS. 1 and 2). The tip ends of the respective radial positioning members 17 are bent slightly inwardly, and contact the base pipe 12.

The circumferential positioning member 18 is engageable with the first tube 13 located above the first tube 13 joined to the second tube 14, among the first tubes 13. More specifically, the circumferential positioning member 18 includes a taper pin 18a, and an L-shaped arm 18b, a first end (one end) of which is connected to the body of the welding device 1 and a second end (the other end) of which supports the taper pin.

The taper pin 18a is capable of being advanced and retracted with respect to the welding device 1. Specifically, the arm 18b supports the taper pin 18a in such a manner that the taper pin 18a is slidable in the protruding direction of the welding torch 21. The taper pin 18a includes a taper portion with a diameter increasing from a diameter smaller than the inner diameter of the first tube 13 to a diameter larger than the inner diameter of the first tube 13. In this structure, the tip end of the taper pin 18a is fittable into the inside of each of the first tubes 13.

In a case where the welding device 1 includes the clamp mechanism 8 (see FIGS. 1 and 2) which clamps the tube, the clamp mechanism 8 cannot clamp the bent portion of the second tube 14. In contrast, in the welding system 15 of the present embodiment, since the support plate 16 is located above the bent second tubes 14, the welding device 1 can be fastened at a flexible location, irrespective of the shape of the second tubes 14. This makes it possible to install the welding device 1 at a location that is optimal for the welding area of the tubes.

In the welding system 15 of the present embodiment, since the pair of radial positioning members 17 are mounted to the welding device 1, and the tip ends of the pair of radial positioning members 17 contact the base pipe 12, the welding device 1 can be positioned in the radial direction of the base pipe 12. In addition, since the welding device 1 is placed on the support plate 16, the welding device 1 can be positioned while the welding device 1 is sliding on the support plate 16. This makes it possible to quickly install the welding device 1 at a proper location.

Further, in the welding system 15 of the present embodiment, since the circumferential positioning member 18 is mounted to the welding device 1, the welding device 1 can also be positioned in the circumferential direction of the base pipe 12. This makes it possible to more quickly install the welding device 1 at a proper location.

(Modified Example of Welding System)

Only the one first tube 13 may protrude horizontally from the base pipe 12. In this case, the base pipe 12 may not necessarily extend vertically, and may extend obliquely or horizontally. The first tubes 13 may not necessarily be short pipes protruding from the base pipe 12, and may be single pipes placed to be oriented horizontally.

In a case where the first tube 13 is the one tube, the support plate 16 of the welding system 15 may be disposed on the one second tube 14. In this case, the support plate 16 may have, for example, a square shape, a rectangular shape, a circular shape, or an oval shape.

In a case where the welding system 15 includes the radial positioning members 17 (irrespective of the presence or absence of the circumferential positioning member 18), the second tubes 14 may not necessarily be bent, and may be straight. Further, in a case where the second tubes 14 are bent, the welding system 15 may include only the support plate 16 without including the radial positioning members 17 and the circumferential positioning member 18.

REFERENCE SIGNS LIST 1 welding device
10 tube
12 base pipe
13 first tube
14 second tube
15 welding system
16 support plate
17 radial positioning member
18 circumferential positioning member
18a taper pin
21 welding torch
22 electrode
23 rotary member
3 gear train
4 table
5 first movement mechanism
6 second movement mechanism
7 third movement mechanism
8 clamp mechanism
9 controller
92 voltage meter (measuring unit)

The invention claimed is:
1. A welding device which performs butt welding of tubes, comprising:

a rotary member of a circular-arc shape to which a welding torch is mounted, the rotary member including external teeth;
a gear train that meshes with the rotary member and rotates the rotary member around a center axis of the tubes;
a table supporting the rotary member and the gear train;
a first movement mechanism that moves the table in a first direction perpendicular to the center axis of the tubes, the first movement mechanism including a first movement mechanism slide block to which the table is fastened, a first movement mechanism screw shaft which is threadingly engageable with the first movement mechanism slide block, and a first motor which rotates the first movement mechanism screw shaft;
a second movement mechanism that moves the first movement mechanism in a second direction perpendicular to the center axis of the tubes and the first direction, the second movement mechanism including a second movement mechanism slide block to which the first movement mechanism is fastened, a second movement mechanism screw shaft which is threadingly engageable with the second movement mechanism slide block, and a second motor which rotates the second movement mechanism screw shaft;
a third movement mechanism that moves the second movement mechanism along the center axis of the tubes, the third movement mechanism including a third movement mechanism slide block to which the second movement mechanism is fastened, a third movement mechanism screw shaft which is threadingly engageable with the third movement mechanism slide block, and a third motor which rotates the third movement mechanism screw shaft; and
a clamp mechanism that secures the third movement mechanism to the tube,
wherein the first movement mechanism, the second movement mechanism, and the third movement mechanism are disposed between the table and the clamp mechanism.

2. The welding device according to claim 1,
wherein the welding torch includes an electrode that generates an arc between the electrode and a welding area of the tubes, the welding device further comprising:
a measuring unit that measures a distance between the electrode and the welding area; and
a controller that controls the first movement mechanism and the second movement mechanism in such a manner that the distance measured by the measuring unit becomes a predetermined value.

3. A welding system used to perform on a horizontal plane butt welding of a first tube and a second tube which is bent, the welding system comprising:
a support plate located above the second tube and fastened to the second tube to cover the second tube; and
a welding device fastened to the support plate in a state in which the welding device is placed on the support plate, the welding device including:
a rotary member of a circular-arc shape to which a welding torch is mounted, the rotary member including external teeth;
a gear train that meshes with the rotary member and rotates the rotary member around a center axis of the tubes;
a table supporting the rotary member and the gear train;
a first movement mechanism that moves the table in a first direction perpendicular to the center axis of the tubes, the first movement mechanism including a first movement mechanism slide block to which the table is fastened, a first movement mechanism screw shaft which is threadingly engageable with the first movement mechanism slide block, and a first motor which rotates the first movement mechanism screw shaft;
a second movement mechanism that moves the first movement mechanism in a second direction perpendicular to the center axis of the tubes and the first direction, the second movement mechanism including a second movement mechanism slide block to which the first movement mechanism is fastened, a second movement mechanism screw shaft which is threadingly engageable with the second movement mechanism slide block, and a second motor which rotates the second movement mechanism screw shaft;
a third movement mechanism that moves the second movement mechanism along the center axis of the tubes, the third movement mechanism including a third movement mechanism slide block to which the second movement mechanism is fastened, a third movement mechanism screw shaft which is threadingly engageable with the third movement mechanism slide block, and a third motor which rotates the third movement mechanism screw shaft; and
a clamp mechanism that secures the third movement mechanism to the tube,
wherein the first movement mechanism, the second movement mechanism, and the third movement mechanism are disposed between the table and the clamp mechanism.

4. A welding system used to perform on a horizontal plane butt welding of a first tube protruding from a base pipe and a second tube, the welding system comprising:
a support plate located above the second tube and fastened to the second tube to cover the second tube;
a welding device fastened to the support plate in a state in which the welding device is placed on the support plate; and
a pair of radial positioning members mounted to the welding device in such a manner that the pair of radial positioning members are located on both sides of the welding torch and protrude from the welding device, the pair of radial positioning members having tip ends, respectively that contact the base pipe,
the welding device including:
a rotary member of a circular-arc shape to which a welding torch is mounted, the rotary member including external teeth;
a gear train that meshes with the rotary member and rotates the rotary member around a center axis of the tubes;
a table supporting the rotary member and the gear train;
a first movement mechanism that moves the table in a first direction perpendicular to the center axis of the tubes, the first movement mechanism including a first movement mechanism slide block to which the table is fastened, a first movement mechanism screw shaft which is threadingly engageable with the first movement mechanism slide block, and a first motor which rotates the first movement mechanism screw shaft;
a second movement mechanism that moves the first movement mechanism in a second direction perpendicular to the center axis of the tubes and the first direction, the second movement mechanism including a second movement mechanism slide block to which the first movement mechanism is fastened, a second movement mechanism screw shaft which is threadingly engageable with the second movement mechanism slide block, and a second motor which rotates the second movement mechanism screw shaft;

a third movement mechanism that moves the second movement mechanism along the center axis of the tubes, the third movement mechanism including a third movement mechanism slide block to which the second movement mechanism is fastened, a third movement mechanism screw shaft which is threadingly engageable with the third movement mechanism slide block, and a third motor which rotates the third movement mechanism screw shaft; and a clamp mechanism that secures the third movement mechanism to the tube, wherein the first movement mechanism, the second movement mechanism, and the third movement mechanism are disposed between the table and the clamp mechanism.

5. The welding system according to claim 4, wherein the base pipe extends vertically and the first tube is each of first tubes arranged vertically, the welding system further comprising:

a circumferential positioning member mounted to the welding device, the circumferential positioning member being engageable with the first tube located above the first tube joined to the second tube, among the first tubes.

6. The welding system according to claim 5, wherein the circumferential positioning member includes a taper pin that is capable of being advanced and retracted with respect to the welding device and has a tip end that is fittable into the first tube.

7. The welding system according to claim 4, wherein the second tube is bent.

* * * * *